United States Patent [19]

Narayanaswamy et al.

[11] Patent Number: 5,905,467

[45] Date of Patent: May 18, 1999

[54] ANTENNA DIVERSITY IN WIRELESS COMMUNICATION TERMINALS

[75] Inventors: Shankar Narayanaswamy, Middletown Township, Monmouth County; Markus Rupp, Lincroft Township, Monmouth County, both of N.J.

[73] Assignee: Lucent Technologies Inc., Murray Hill, N.J.

[21] Appl. No.: 08/900,247

[22] Filed: Jul. 25, 1997

[51] Int. Cl.⁶ ........................................................ H01Q 1/24
[52] U.S. Cl. .................. 343/702; 343/700 MS; 343/724; 343/866; 343/853; 343/871
[58] Field of Search ...................... 343/702, 749, 343/725, 700 MS, 793; 455/89, 90, 575, 133, 134, 135

[56] References Cited

U.S. PATENT DOCUMENTS

| | | | |
|---|---|---|---|
| 4,992,799 | 2/1991 | Garay | 343/702 |
| 5,337,061 | 8/1994 | Pye et al. | 343/702 |
| 5,561,437 | 10/1996 | Phillips et al. | 343/702 |
| 5,564,078 | 10/1996 | Nagai | 455/89 |
| 5,572,223 | 11/1996 | Phillips et al. | 343/702 |
| 5,649,306 | 7/1997 | Vannatta et al. | 455/575 |

*Primary Examiner*—Robert H. Kim
*Assistant Examiner*—Layla G. Lauchman

[57] ABSTRACT

A wireless communication terminal comprises a first housing section including an antenna for enabling wireless communications with the terminal and a second housing section including a second communications antenna, the second housing section being extendibly connected to the first housing in an manner such that when the second housing section is in its extended position the second antenna is located one half wavelength from the first antenna. One or both of the antennas may be a fixed type, e.g., a whip or stub, or a retractable type, e.g., telescoping. The antennas may be located external or may be internal (e.g., patch type antennas) to the housing sections.

18 Claims, 5 Drawing Sheets

SELECTIVE COMBINING

SWITCHED COMBINING

MAXIMAL-RATIO COMBINING

EQUAL-GAIN COMBINING

ANTENNA DIVERSITY IN WIRELESS COMMUNICATION TERMINALS

CROSS-REFERENCE TO RELATED APPLICATIONS

Related subject matter is disclosed in the concurrently filed application entitled "Transparent Antennas for Wireless Terminals", by the same inventors, Ser. No. 08/900,246, filed on Jul. 25, 1997, both of these applications are assigned to the same Assignee.

TECHNICAL FIELD OF THE INVENTION

This invention relates to portable wireless devices or terminals and, more particularly, to the use of multiple antennas to provide antenna diversity in such devices.

BACKGROUND OF THE INVENTION

Small portable wireless communication devices typically include a single stub, patch, or L-shaped antenna to receive/transmit over a wireless communications link to the device. While such antenna arrangements generally work well, there remains dead or weak spots which require the user to change position or move to obtain better reception/transmission. This is particularly true for devices such as a Personal Digital Assistance (PDA) which use a patch antenna which is usually placed on the back of the PDA. Such PDAs often must be oriented with the back facing the general direction of the base station to obtain good reception.

Unfortunately, because of the small dimensions of these wireless communication devices, there is typically no way to add a second antenna to provide antenna diversity. Thus there is a continuing need to improve the performance of these wireless communication devices.

The present invention describes a technique for placing more than one antenna on a wireless expandable terminal which is extended during use. In accordance with the present invention, a second antenna is placed in a moveable section that extends away from the main body of the device, in the extended position the second antenna is located at a spacing which is half a carrier wavelength from the main antenna. The second antenna can be a fixed or a retractable antenna.

The use of multiple antennas on a wireless terminal has been described in the prior art, for example see U.S. Pat. No. 5,337,061 entitled "High Performance Antenna for Hand-Held and Portable Equipment" issued to M. R. Pye et al on Aug. 9, 1994. In that patent the terminal is provided with two antennas which are not used for antenna diversity purposes, but rather the second antenna is switchably substituted for a first antenna when the performance of that first antenna is degraded due to its proximity to the user's head or other obstacle. Since the two antennas, are not necessarily located one half wavelength apart they do not provide the antenna diversity of our invention. Additionally, the Pye patent switches between the two antennas rather than combining both antenna signals as in our invention.

SUMMARY OF THE INVENTION

More particularly, the present invention is directed to a wireless communication terminal comprising a first housing section including an antenna for enabling wireless communications with the terminal and a second housing section including a second communications antenna, the second housing section being extendibly connected to the first housing in an manner such that when the second housing section is in its extended position the second antenna is located one half wavelength from the first antenna.

According to other features of the invention, one or both of the antennas may be a fixed type, e.g., a whip or a stub, or a retractable type, e.g., telescoping. The antennas may be located external or internal to the housing sections. The antennas may also be helical, dipole, or patch type antennas.

DETAILED DESCRIPTION

We have noted that at some communication frequencies, the wavelength of the carrier signal is about the size of a mobile wireless terminal. It is therefore possible to place an extra antenna on part of the terminal that would be a half of wavelength away from the main antenna. Such an arrangement would provide antenna diversity and thereby improve communication channel performance of the mobile wireless terminal.

In accordance with the present invention, for a portable or wireless terminal or device which has hinged or other type of extendible housing, e.g., a clam shell casing, we can take advantage of the larger extended dimension of the terminal by placing an extra antenna in the extendible housing section, thereby improving the reception performance of the wireless terminal.

For example, this scheme may be used in cellular or Personal Communication Service (PCS) telephones and data terminals (such as a cellular Personal Digital Assistant (PDA)) which open up during use. In one type of PCS terminal, communications occur over a 1.9 GHz PCS band where one wavelength is about 6 inches, so half a wavelength is about 3 inches. In such a wireless device or terminal which has a section that extends out during use (e.g., are implemented using a clam shell housing), an extra antenna may be placed on the movable section of the housing. The position of the second antenna on the extendible piece is selected to be half wavelength from the main antenna when the extendible piece is fully extended. Such a dual antenna configuration affords a significant improvement in received carrier strength; conventional signal combining techniques, described later, may be used to process the diverse received antenna signals.

Figure 1:
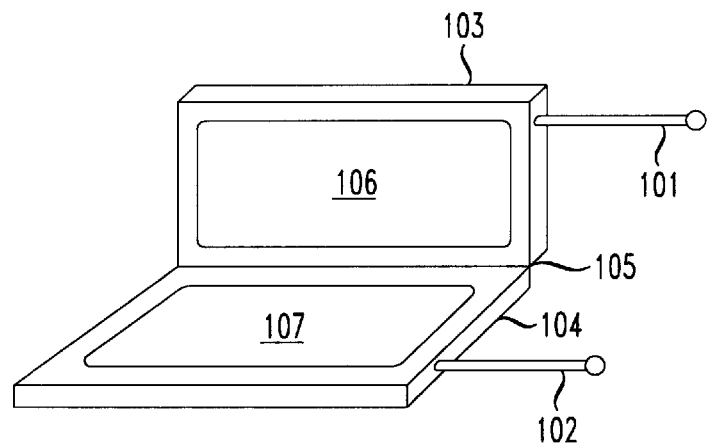
FIG. 1 shows an illustrative wireless communication terminal having a clamshell housing in an opened position and which includes an antenna in each half of the housing.

With reference to FIG. 1 there is shown an illustrative wireless communication device (e. g., terminal) having a foldable or clamshell type housing in an opened position and which includes an antenna in each half of the housing. As shown, one antenna 101 is located on one half of the housing 103, e.g., the half that includes a liquid crystal display (LCD) or a touch screen display 106. A second antenna is located on the other half of the housing 104, e.g., the half that includes a keyboard or another touch screen display 107. The two halves 103 and 104 of the housing are arranged to rotate about a hinge connection 105 to enable the device, when not in use, to be folded together into a closed position to protect the display(s) and keyboard on the surfaces 106 and 107.

While a whip antenna is shown, illustratively, as the antenna in each half of the device housing of FIG. 1, it should be noted that these antennas need not be the same type. Additionally, one or both of the antennas may be implemented as retractable (e.g., telescoping antenna), and thereby allow for storage when not in use. Moreover, one antenna 102 can be fixed while the other antenna 103 may be retractable. These antennas may be located externally (FIG. 1) or, alternatively, be built into the device housing (FIG. 2) so that they are unobtrusive.

It should be noted that other types of antennas may be utilized including stub, helical, dipole, or patch antennas. Such antennas are well known as described in the book entitled "Antennas" by J. Kraus, published by McGraw-Hill, 1988. Such patch antennas are of well known designs as described in the book entitled "Broadband Patch Antennas" by J. F. Zurcher and F. Gardiol, published by Artech House, 1995.

Figure 2:
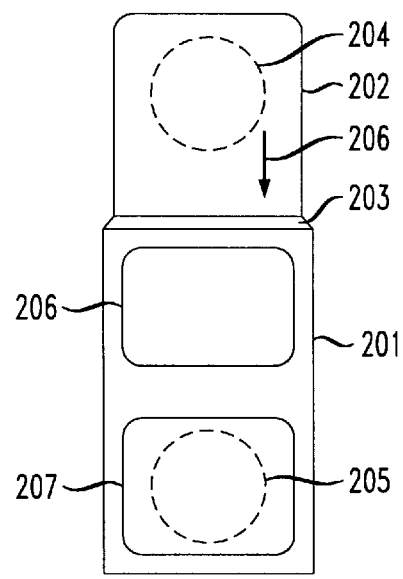
FIG. 2 shows an embodiment of the present invention as part of a wireless terminal having a slideably extendible (or retractable) housing section which slides into an opening of the main housing section.

With reference to FIG. 2 there is shown an embodiment of the present invention as part of a wireless terminal having a slideably extendible (or retractable) housing section 202 which slides into an opening 203 of the main housing section 201. As shown, when the wireless terminal is in its extended position, the illustrative circular patch antenna 204 of the slideably extendible housing section 202 is located one-half wavelength from the circular patch antenna 205 of the main housing section 201. These patch antennas are shown in dotted lines since they, typically, would be imbedded within the housing sections (or parts) and not visible. To close the wireless terminal, the slideably extendible housing section 202 is slid in the direction 206 into the main housing part 201. The main housing section 201 would typically contain one or more displays 206 and perhaps a keyboard located 207 on its surface.

With reference to FIG. 3, there is shown a variety of patch antennas which may be used in the extendible housing section 202 and main housing section 201 of the wireless terminal of FIG. 2. As shown in FIG. 3a, the patch antennas may have an L-shape with each leg being one-half wavelength long. The L-shaped patch antenna is a recent antenna design which also allows for polarization diversity in the received signal. This means that the L-shaped antenna is able to receive signals of all polarizations. In comparison, a single strip antenna may not receive signals that are polarized at 90 degrees to the single strip antenna. Shown in FIG. 3b, is a circular shaped patch antenna with a one-half wavelength diameter. A square shaped patch antenna with each side being one-half wavelength long is shown in FIG. 3c. Such a square shaped patch antenna appears to be the preferred shape for our transparent patch antenna. Shown in FIG. 3d is a triangular shaped patch antenna which is one-half wavelength long on each side. Shown in FIG. 3e is a microstrip rectangular shaped patch antenna. Such an antenna would have a length that is a half wavelength and a width is much less than a half of wavelength.

The feed point for the patch antennas of FIG. 3 may use a variety of techniques. One technique uses a microstrip feed, e.g., 301 of FIG. 3b, which consists of a thin strip of conducting material that connects to an edge, 302 of FIG. 3b, of the patch antenna.

Figure 3A:
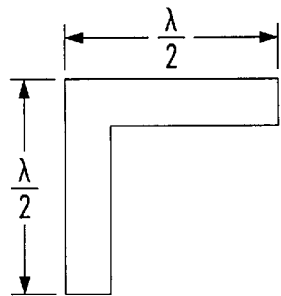
FIGS. 3a–3e illustrate a variety of patch antennas which may be used in the extendible housing and main housing sections of the wireless terminal of FIG. 2.
Figure 3B:
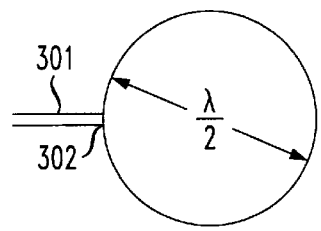
Figure 3C:
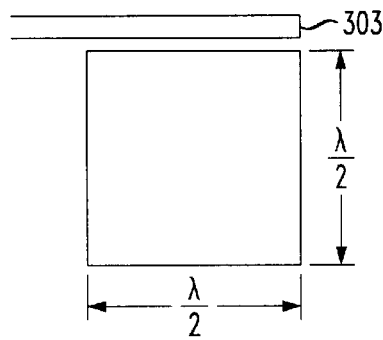
Figure 3D:
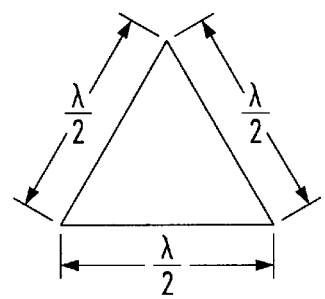
Figure 3E:
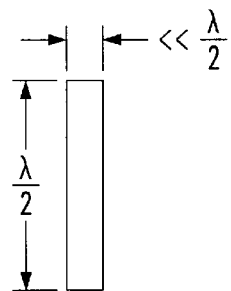

An alternate feed technique which may be used is a coupled feed. A coupled feed, e.g., 303 of FIG. 3c, is similar to the microstrip feed but it electromagnetically couples signals to the patch antenna rather than being connected to the patch antenna.

Another alternative feed that may used is a buried feed. A buried feed is similar to a coupled feed except that it is buried within the dielectric layer that supports the patch antenna, rather than running on top of the dielectric layer, as is shown in FIG. 3b.

Yet another technique is a slot feed. In a slot feed arrangement, the ground plane is sandwiched between two dielectric layers. The patch antenna is located on one surface of one dielectric, whereas the feed line is located on the corresponding surface of the second dielectric. Such an arrangement allows the antenna and the feed line to be located on dielectrics of different thicknesses.

Another technique may be the use of a coaxial feed. Such a feed consists of a coaxial cable running perpendicular to the ground plane 203; the signal wire would run through a slot in the ground plane to connect to the patch antenna. However, such an arrangement does not appear to be very practical.

The patch antennas of FIG. 3 are of well known designs as described in the book entitled "Broadband Patch Antennas" by J. F. Zurcher and F. Gardiol, published by Artech House, 1995. Other well known antenna designs are also described in the book entitled "Antennas" by J. Kraus, published by McGraw-Hill, 1988.

With reference to FIGS. 4a through 4d there is shown four different illustrative diversity combiners which may be used in a receiver/transmitter unit of a wireless terminal. When there are two receiving antennas, there are four major combining techniques which may be utilized. These techniques are also readily extended to the use of more than two antennas. The FIGS. 4a–4d are the four well known diversity combiners techniques shown on page 120 and described at pages 119–122 of the book entitled "Mobile Communications Design Fundamentals" by W. Lee, published by Wiley, 1993. Similar techniques are also described in the book entitled "Wireless Communications: Principles and Practice" by T. Rappaport, published by IEEE Press, 1996.

Figure 4A:
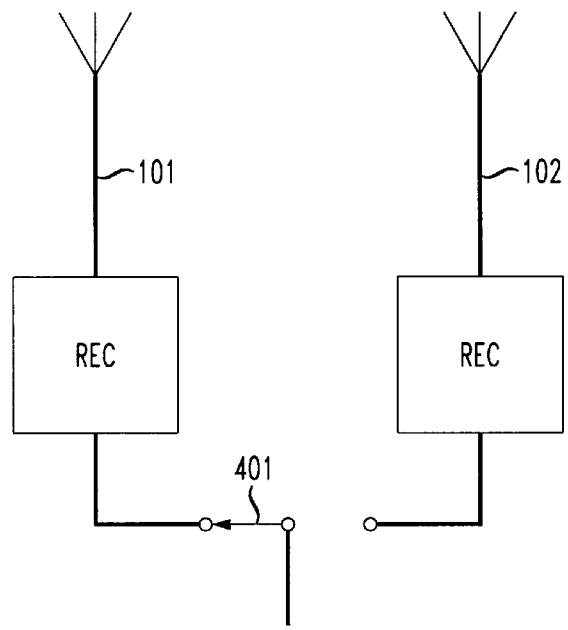
FIGS. 4a–4d show an illustrative block diagram of antenna signal combiner circuits of a wireless terminal of FIG. 2.

With reference to FIG. 4a, there is shown a selective combining arrangement where the more powerful of the received antenna signals is selected, using switch 401, for use by the mobile terminal.

Figure 4B:
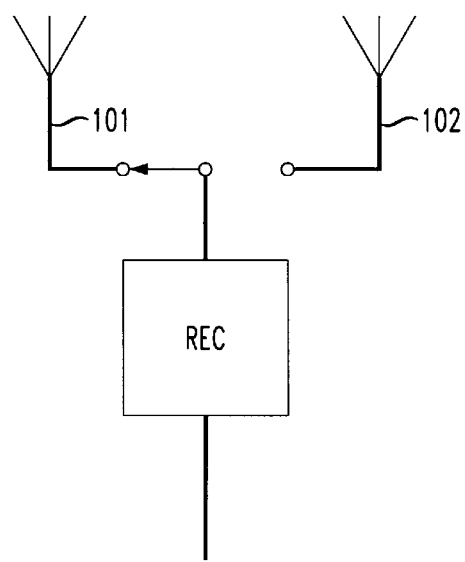

Shown in FIG. 4b is a switching combining arrangement whereby when the received signal on an antenna, e.g., 101, gets too weak, the system switches to the other antenna 102 regardless of the signal level on antenna 102. The results are inferior to that of the other combining techniques, but is the simplest to implement.

Figure 4C:
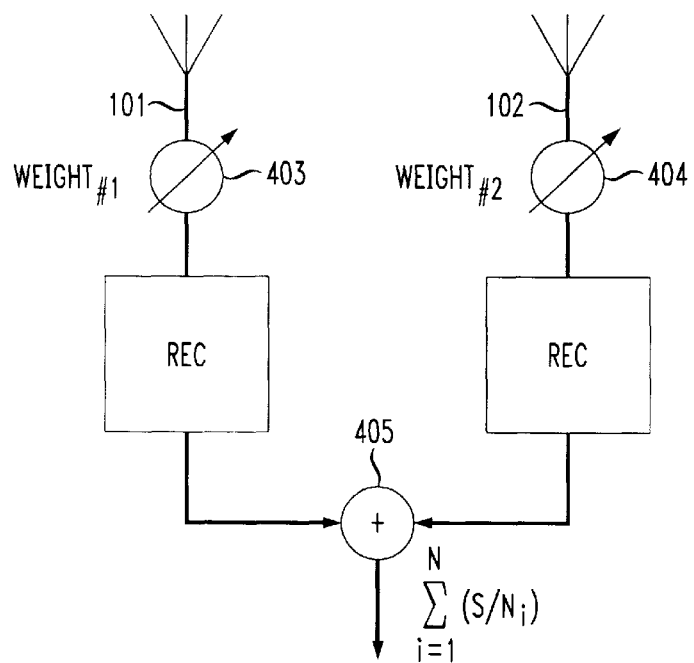

Shown in FIG. 4c is a maximal-ratio combining arrangement which mathematically is the best technique, but which requires the most signal processing. The signals received from antennas 101 and 102 are weighted using circuits 403 and 404, respectively, according to their signal-to-noise ratio (SNR) and summed, in summer circuit 405. The weighting factors are chosen to maximize the SNR of the combined signal; these weights are proportional to the individual voltage SNRs. The signals are co-phased before being summed. This means that each signal's phase is adjusted to match the other signal's phase.

Figure 4D:
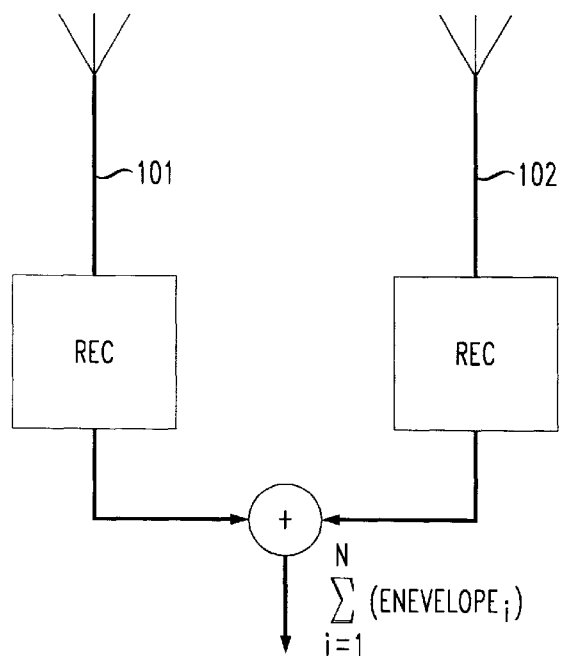

Shown in FIG. 4d is an equal-gain combining arrangement which adds together the received signals from both antennas.

In each of the receiver units shown in FIGS. 4a–4d, the received signal is processed using standard demultiplexing, and/or demodulating and/or decoding techniques.

During the transmission phase, the transmitted signal from a transmitter unit, not shown, is coupled in the conventional manner to one of the antennas 101 and 102 for transmission.

Figure 5:
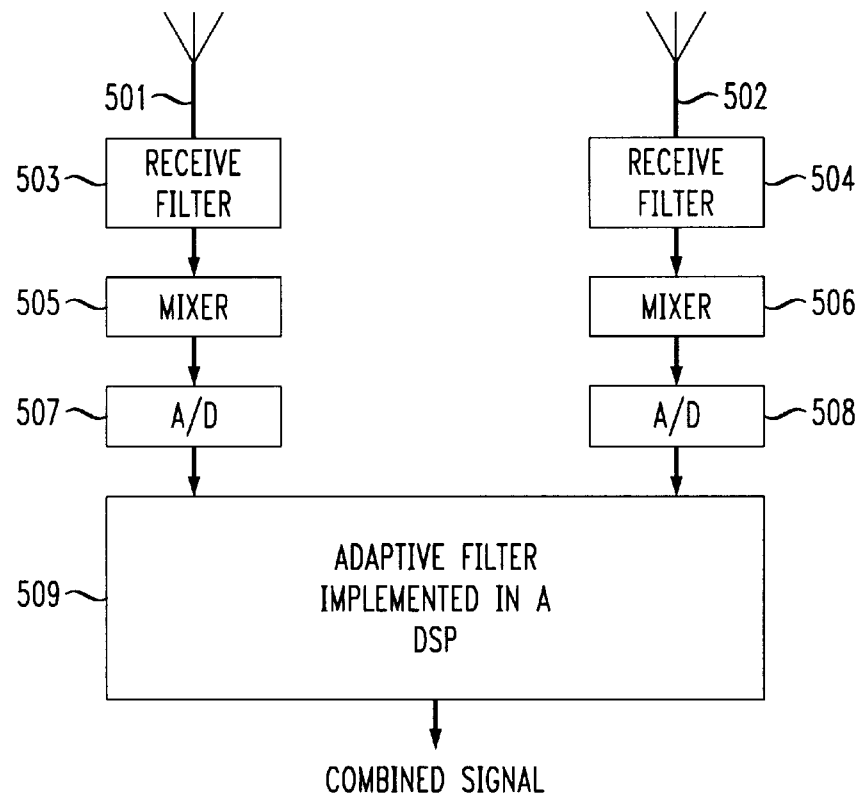
FIG. 5 shows another illustrative block diagram of a maximal ratio combiner using adaptive digital filtering for use in a wireless terminal of FIG. 2.

With reference to FIG. 5, there is shown another block diagram of a maximal ratio combining technique, similar to that shown in FIG. 4c, which uses adaptive digital filtering of the incoming signals. A Digital Signal Processor (DSP) 509 is used to calculate the filter coefficients using standard algorithms such as a Least Means Squares (LMS) or Least Squares (LS). This is a more sophisticated way to weigh the incoming signals and produces better results. As shown, the signal from antennas 501 and 502 are filtered by filters 503 and 504, respectively, to prevent aliasing. The outputs of filters 503 and 504 are demodulated to a baseband signal, by mixers 505 and 506, respectively, and then sampled using an Analog-to-Digital (A/D) converter, 507 and 508, respectively. The resulting digital signal from A/D converters 507 and 508 are fed into an adaptive digital filter, implemented in a DSP 509, which combines the signals digitally. The DSP 509 further processes the digital signal in a well known manner.

The antennas 101 and 102 should be located at least one half wavelength apart. The aim of separating the antennas is to reduce the correlation between the received signals at the antennas. A half wavelength separation guarantees nearly zero correlation. A smaller separation would result in a greater correlation.

Figure 6:
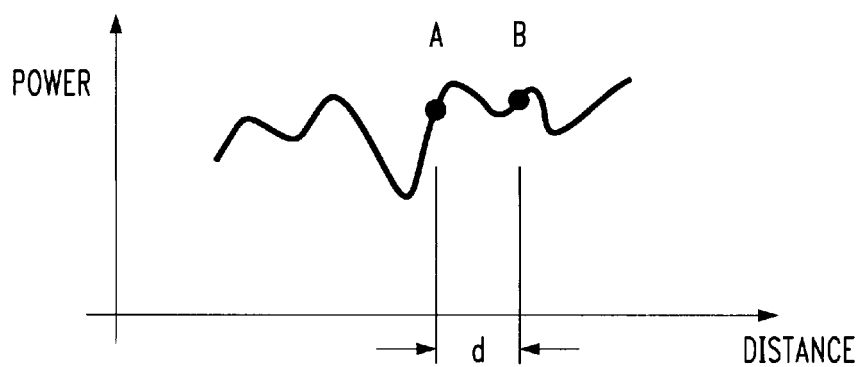
FIG. 6 shows an illustrative curve of the received signal power in a Rayleigh fading environment.

With reference to FIG. 6, there is shown an illustrative curve of the received signal power in a Rayleigh multipath fading environment. The antennas 101 and 102 should be located at positions A and B, separated by a distance d. We want the signals at A and B to be uncorrelated. It can be shown that in a multipath fading environment, d must be at least one half a wavelength for the signals to be uncorrelated.

The diversity antenna arrangement of the present invention provides a convenient manner for incorporating a second antenna at a mobile terminal to improve reception performance and to reduce the likelihood of receive signal fades.

What has been described is merely illustrative of the application of the principles of the present invention. Other arrangements and methods can be implemented by those skilled in the art without departing from the spirit and scope of the present invention.

We claim:

1. A wireless communication terminal comprising
   a first housing section including an antenna for enabling wireless communications with the terminal,
   a second housing section of the terminal including a second communication antenna, the second housing section being extendibly connected to the first housing in an manner such that when the second housing section is in its extended position the second antenna is located at least one half wavelength from the first antenna, wherein the first and second antennae have matched impedances, at frequencies used for wireless communications, when the second antenna is in its extended position, and
   an electronic signal combiner, responsive to characteristics of signals received over the first and second antennas, for determining how to combine these received signals.

2. The wireless communication terminal of claim 1 wherein the first and second antennae are the same type.

3. The wireless communication terminal of claim 1 wherein one of the first and second antennae is a retractable antenna.

4. The wireless communication terminal of claim 1 wherein one of the first and second antennae is a patch antenna.

5. A wireless communication terminal comprising
   a first housing section including an antenna for enabling wireless communications with the terminal,
   a second housing section of the terminal including a second communication antenna, the second housing section being extendibly connected to the first housing in an manner such that when the second housing section is in its extended position the second antenna is located at least one half wavelength from the first antenna wherein one of the first and second antennae is a stub antenna.

6. The wireless communication terminal of claim 1 wherein the first and second antennae are located within their respective housing part.

7. The wireless communication terminal of claim 1 wherein the first antenna is fixed and the second antenna is extendible.

8. The wireless communication terminal of claim 1 wherein the first and second housing section are hinged together in a manner to form a foldable terminal.

9. The wireless communication terminal of claim 1 wherein the second housing section is slideably extendible from the first housing section.

10. A wireless communication terminal comprising
    a first housing section including an antenna for enabling wireless communications with the terminal,
    a second housing section of the terminal including a second communication antenna, the second housing section being extendibly connected to the first housing in an manner such that when the second housing section is in its extended position the second antenna is located at least one half wavelength from the first antenna, wherein signals received from the first and second antennae are combined using a selective combining arrangement where the more powerful of the received first and second antenna signals is selected for use by the terminal.

11. A wireless communication terminal comprising
    a first housing section including an antenna for enabling wireless communications with the terminal,
    a second housing section of the terminal including a second communication antenna, the second housing section being extendibly connected to the first housing in an manner such that when the second housing section is in its extended position the second antenna is located at least one half wavelength from the first antenna, wherein signals received from the first and second antennae are combined using a switched combining arrangement whereby when the received signal on one antenna gets too weak, the terminal switches to the other antenna regardless of the signal level on the other antenna.

12. A wireless communication terminal comprising
    a first housing section including an antenna for enabling wireless communications with the terminal, a second housing section of the terminal including a second communication antenna, the second housing section being extendibly connected to the first housing in an manner such that when the second housing section is in its extended position the second antenna is located at least one half wavelength from the first antenna, wherein signals received from the first and second antennae are combined using a maximal-ratio combining arrangement in which the signals received from antennae are weighted according to their signal-to-noise ratio (SNR), co-phased and summed, and wherein the weighting factors are chosen to maximize the SNR of the summed signal.

13. A wireless communication terminal comprising a first housing section including an antenna for enabling wireless communications with the terminal, a second housing section of the terminal including a second communication antenna, the second housing section being extendibly connected to the first housing in an manner such that when the second housing section is in its extended position the second antenna is located at least one half wavelength from the first antenna, wherein signals received from the first and second antennae are combined using an equal-gain combining arrangement which adds together the received signals from both antennae.

14. The wireless communication terminal of claim 1 wherein at least one of the first and second antennas is a patch antenna which uses a microstrip feed to connect to a receive circuit of the terminal.

15. The wireless communication terminal of claim 1 wherein at least one of the first and second antennas is a patch antenna which uses a coaxial feed to connect to a receive circuit of the terminal.

16. The wireless communication terminal of claim 1 wherein at least one of the first and second antennas is a patch antenna which uses electromagnetic coupling to a receive circuit of the terminal.

17. The wireless communication terminal of claim 1 wherein at least one of the first and second antennas is a patch antenna which uses a slot feed to connect to a receive circuit of the terminal.

18. The wireless communication terminal of claim 1 wherein at least one of the first and second antennas is a patch antenna which uses a buried feed to connect to a receive circuit of the terminal.

* * * * *